United States Patent Office 2,982,896
Patented May 2, 1961

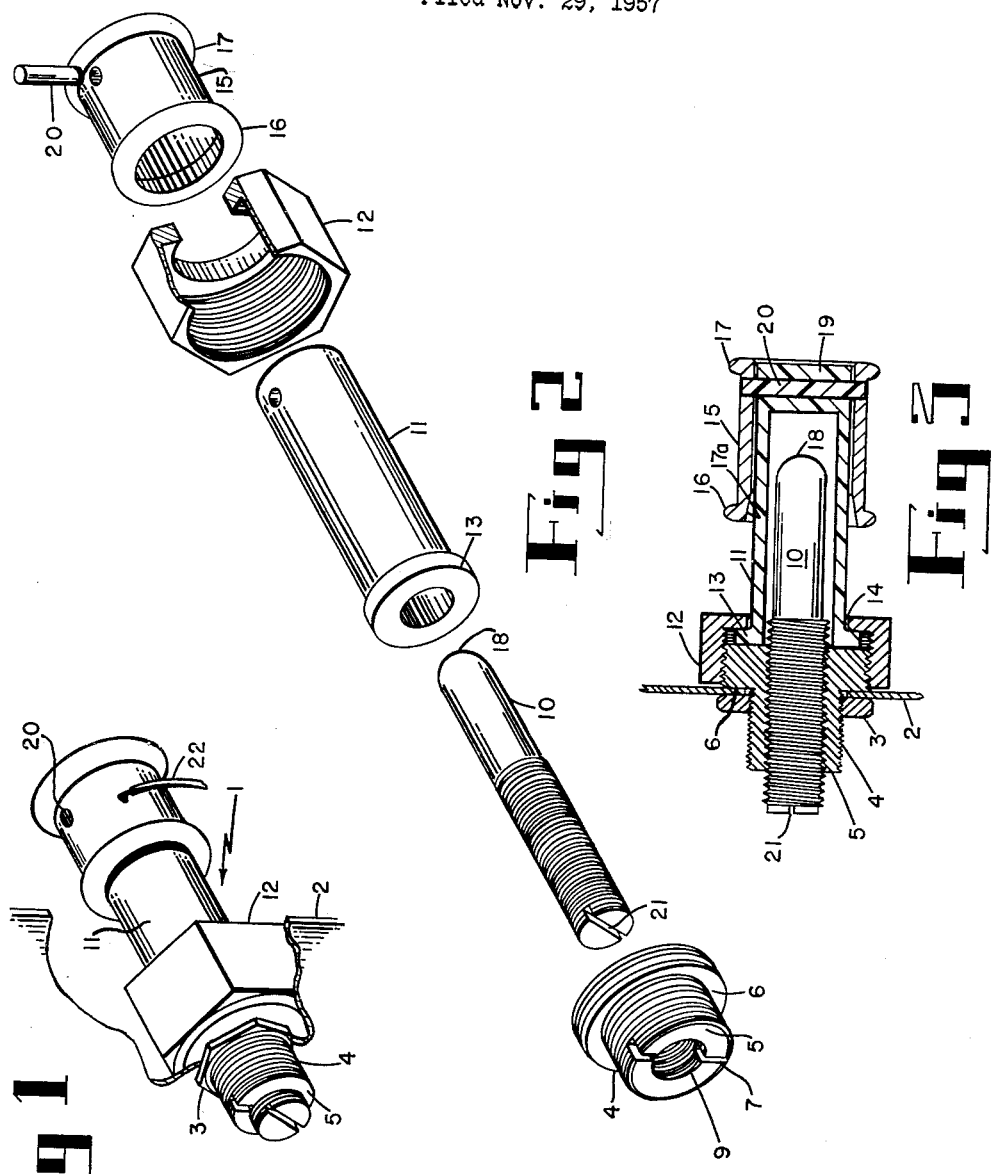

2,982,896

VARIABLE CAPACITOR

Joseph F. Cleary, Norwood, and Henry R. Guarino, Revere, Mass., assignors to Avco Manufacturing Corporation, Cincinnati, Ohio, a corporation of Delaware Filed Nov. 29, 1957, Ser. No. 699,668

1 Claim. (Cl. 317—249)

The present invention relates to a variable capacitor, particularly one of the adjustable core type, which is adapted for use in high frequency, high voltage circuits.

A conventional approach in producing variable capacitors involves provisions of a hollow electrode within which is provided a second electrode, the two electrodes being moveable relative to each other for varying the capacity therebetween. A wide range of dielectrics have been used in combination with such elements, depending upon the particular application for which the capacitor is intended. It is to this class of equipment that the present invention relates.

In the past, emphasis has been placed on accuracy of adjustment of the electrodes, low cost, and ease of fabrication and assembly. Being desirable characteristics, the present invention partakes of all of them but goes beyond in providing a capacitor which is capable of withstanding extremely high potentials at high frequency without breakdown of the dielectric or energy losses through corona discharge.

In brief, the present invention comprises an adapter for rigid attachment to the chassis of a piece of electronic equipment. A hollow plastic sleeve is fixedly secured to the adapter coaxially with a threaded hole through it. The electrodes of the capacitor consist of a metallic plunger adjustably engaged with the threaded hole of the adapter and a metallic ring which is pinned to the end of the sleeve remote from the adapter. The ring includes anti-corona ferrules and is internally tapered to reduce stress gradients in the sleeve.

Accordingly, it is an object of the present invention to provide the following:

(a) An improved variable capacitor.

(b) A capacitor that can be used in high frequency, high voltage circuits without breakdown or significant energy loss.

(c) A capacitor that is easily assembled and accurately adjustable to a preferred capacitance value.

(d) A capacitor which is specially designed to prevent corona discharge.

(e) A capacitor having gradual stress gradients in its dielectric.

(f) A capacitor which, when fully assembled, constitutes a sealed unit into which dirt cannot enter.

(g) A capacitor having high Q and low inductance.

The novel feature that we consider characteristic of our invention are set forth in the appended claim; the invention itself, however, both as to its organization and method of operation, together with additional objects and advantages thereof, will best be understood from the following description of a specific embodiment when read in conjunction with the accompanying drawings in which:

Figure 1 is a perspective view of the variable capacitor secured to a section of a chassis;

Figure 2 is an exploded view of the capacitor showing in perspective the individual elements of the assembly; and Figure 3 is a longitudinal, sectional view through the assembled capacitor.

As shown in Figure 1, the variable capacitor, generally designated 1, is secured to chassis 2 by means of a lock nut 3. The lock nut is engaged with the threads 4 of adapter 5, securing it firmly to the chassis. As indicated in Figures 2 and 3, the adapter includes shoulder 6 which bears against the face of the chassis remote from nut 3. A screw driver slot may be provided at 7 as an aid in holding the adapter stationary while nut 3 is tightened against the chassis.

The adapter is internally threaded at 9 for adjustably supporting threaded electrode 10. For convenience, this electrode may be called a plunger since it is longitudinally adjustable into and out of a dielectric sleeve 11, which is secured to the adapter by nut 12. This sleeve includes an integral flange 13 which is clamped against the adapter by the nut 12. In addition, the nut is closely fitted to the sleeve at 14 to center it coaxially with the threaded opening 9 of the adapter.

The other electrode of the capacitor consists of a metallic ring 15, which is supported by the end of the sleeve remote from the adapter. This sleeve is smoothly contoured and includes anti-corona ferrules 16 and 17 to minimize air breakdown when the electric stress at the surface of the ring attains high values. Further, the interior of the ring facing the adapter is outwardly tapered at 17a to reduce the stress gradients set up in the plastic sleeve by the potential difference between the electrodes.

To further reduce corona discharge and breakdown of the dielectric of the sleeve, the plunger 10 is smoothly contoured in the region adjacent the ring and includes a fully rounded end 18.

It will be noted that the end of the sleeve 19 remote from the adapter is closed to prevent dirt from entering the interior of the assembly. Through this closed end a plastic pin 20 may be secured to hold the ring 15 in place.

The plunger and ring can be made from a wide range of materials. For convenience of fabrication, however, free machining brass is recommended. The same material can be used for making the adapter 5 and the nut 12.

The sleeve may be made from a wide variety of materials having suitable dielectric properties. By actual tests, it has been determined that Teflon is ideally suited to this application. Such material is also known as a polymer of tetrafluoroethylene. Another material which may be used with very satisfactory results is a polymer of monochlorotrifluoroethylene.

By using a pin 20 of Teflon or similar material, the possibility of voltage breakdown through the end of the sleeve is eliminated.

As will be readily understood by those skilled in the art, the plunger 10 may be easily and accurately adjusted longitudinally to provide greater or lesser penetration into the ring. Accuracy of adjustment is assured by close fit of the plunger in the threaded opening and by provision of fine threads. A screw driver slot is provided at 21 to simplify the adjustment of the plunger.

It has been determined by extensive tests that this capacitor is well suited for use in high voltage circuits. In fact, it has been used successfully in a voltage range of 45 to 5000 volts in circuits operating between 200 and 600 megacycles in frequency. Obviously, the proportions of the capacitor may be chosen for the capacity that is desired. Miniature units approximately an inch and a half in over-all length have been produced having capacity ranging from 0.5 mmf. to 4.2 mmf.

Experience with this capacitor has demonstrated that the provision of the anti-corona ferrules at 16 and 17, combined with the rounded end 18 of the plunger, reduces corona losses to a negligible level and totally prevents dielectric breakdown even at potentials as high as 5 kilovolts. Further, the taper 17 of the electrode ring reduces the stress gradient in the sleeve and prevents physical rupture under electric stress.

The relatively large diameter of the plunger relative to its length insures low inductance.

Electric connection can easily be made with the electrodes. In conventional fashion, electrode 18 is grounded to the chassis through the electrically conductive adapter 5. Connection can be made to the ring by soldering lead wire 22 directly to it. In positioning the lead wire, due regard must be had for the presence of high R.F. voltage.

From the foregoing description it will be understood that we have provided a high quality variable capacitor arranged to operate satisfactorily at unusually high values of frequency and potential.

Having described the preferred embodiment of our invention, we claim:

In combination in a variable capacitor a dielectric sleeve having a closed end and a transverse passage defined in the closed end, a metallic plunger positioned in said sleeve and axially adjustable with respect thereto, a metallic ring surrounding the exterior of said sleeve, said ring having diametrically opposing apertures alignable with the transverse passage, and dielectric rod means passing through the aforementioned apertures and transverse passage for detachably securing said metallic ring to the closed end, whereby metallic rings of various lengths and tapers may be readily interchanged to alter the capacity range and characteristics of said variable capacitor.

References Cited in the file of this patent

UNITED STATES PATENTS

| | | |
|---|---|---|
| 1,641,438 | Jones | Sept. 6, 1927 |
| 2,059,816 | Schwarzhawpt | Nov. 3, 1936 |
| 2,212,231 | Gossel et al. | Aug. 20, 1940 |
| 2,219,003 | Braunschweig | Oct. 22, 1940 |
| 2,253,978 | Meriwether | Aug. 26, 1941 |
| 2,578,608 | Shull | Dec. 11, 1951 |
| 2,774,017 | Shapp | Dec. 11, 1956 |
| 2,794,159 | Wadsworth | May 28, 1957 |

FOREIGN PATENTS

| | | |
|---|---|---|
| 263,948 | Great Britain | Jan. 10, 1927 |
| 648,228 | Great Britain | Jan. 3, 1951 |
| 768,410 | Great Britain | Feb. 13, 1957 |

OTHER REFERENCES

Zenger: (German publication) R8587 VIII c/21g, March 8, 1956.